US008930047B2

(12) United States Patent
Robinson et al.

(10) Patent No.: US 8,930,047 B2
(45) Date of Patent: Jan. 6, 2015

(54) SYSTEMS AND METHODS FOR DETERMINING A POSITIONAL STATE OF AN AIRBORNE ARRAY ANTENNA USING DISTRIBUTED ACCELEROMETERS

(75) Inventors: Brendan H. Robinson, Rancho Palos Verdes, CA (US); John H. Steele, II, Palos Verdes Estates, CA (US); Clifton Quan, Arcadia, CA (US); Leo H. Hui, Alhambra, CA (US)

(73) Assignee: Raytheon Company, Waltham, MA (US)

( * ) Notice: Subject to any disclaimer, the term of this patent is extended or adjusted under 35 U.S.C. 154(b) by 230 days.

(21) Appl. No.: 13/177,802

(22) Filed: Jul. 7, 2011

(65) Prior Publication Data

US 2013/0009818 A1 Jan. 10, 2013

(51) Int. Cl.

| | |
|---|---|
| ***G06F 17/00*** | (2006.01) |
| ***G06F 15/00*** | (2006.01) |
| ***H01Q 3/00*** | (2006.01) |
| ***H01Q 1/12*** | (2006.01) |
| ***H01Q 1/28*** | (2006.01) |
| ***H01Q 21/06*** | (2006.01) |
| ***H01Q 23/00*** | (2006.01) |

(52) U.S. Cl.

CPC ................. *H01Q 1/125* (2013.01); *H01Q 1/28* (2013.01); *H01Q 3/00* (2013.01); *H01Q 21/06* (2013.01); *H01Q 23/00* (2013.01)

USPC .............................. 701/13; 342/359; 702/141

(58) Field of Classification Search

USPC .............................. 701/13; 342/359; 702/141

See application file for complete search history.

(56) References Cited

U.S. PATENT DOCUMENTS

| | | | | |
|---|---|---|---|---|
| 4,806,940 | A * | 2/1989 | Harral et al. | 342/451 |
| 5,623,270 | A | 4/1997 | Kempkes et al. | |
| 6,014,103 | A * | 1/2000 | Sumner et al. | 342/457 |
| 6,333,712 | B1 | 12/2001 | Haugse et al. | |
| 6,493,631 | B1 * | 12/2002 | Burns | 701/472 |

(Continued)

FOREIGN PATENT DOCUMENTS

| | | | | |
|---|---|---|---|---|
| EP | 1 819 012 | A2 | 8/2007 | |
| EP | 1819012 | A2 * | 8/2007 | H01Q 1/00 |

OTHER PUBLICATIONS

Extended European Search Report for European Application No. 12166599.6, Extended European Search Report dated Oct. 4, 2012 and mailed Oct. 11, 2012 (7 pgs.).

*Primary Examiner* — Fadey Jabr
*Assistant Examiner* — Yazan A Soofi
(74) *Attorney, Agent, or Firm* — Christie, Parker & Hale, LLP

(57) ABSTRACT

Systems and methods for determining a positional state of an airborne array antenna using distributed accelerometers are described. One such method includes receiving and formatting acceleration data from each of a plurality of accelerometers mounted at different locations along the array antenna, receiving position and orientation data from an inertial navigation service (INS) mounted on the array antenna, generating an INS estimated position for each accelerometer based on the position and orientation data from the INS, generating an accelerometer estimated position for each accelerometer based on the acceleration data, determining a position and orientation of each accelerometer based on the respective INS estimated position and the respective accelerometer estimated position, determining an estimated position of a center and an orientation of the array antenna based on the determined position and orientation of each accelerometer, and adjusting a direction of the array antenna based on the estimated position of the array antenna.

17 Claims, 7 Drawing Sheets

(56) References Cited

U.S. PATENT DOCUMENTS

| | | | | |
|---|---|---|---|---|
| 2003/0120448 | A1 * | 6/2003 | Moriya et al. | 702/95 |
| 2005/0264449 | A1 * | 12/2005 | Strickland | 343/700 MS |
| 2009/0007661 | A1 * | 1/2009 | Nasiri et al. | 73/504.03 |
| 2009/0128430 | A1 * | 5/2009 | Lee et al. | 343/705 |
| 2011/0257927 | A1 * | 10/2011 | Bharadwaj et al. | 702/150 |

* cited by examiner

SYSTEMS AND METHODS FOR DETERMINING A POSITIONAL STATE OF AN AIRBORNE ARRAY ANTENNA USING DISTRIBUTED ACCELEROMETERS

STATEMENT REGARDING FEDERALLY SPONSORED RESEARCH OR DEVELOPMENT

This invention was made with Government support under Contract No. HR0011-09-C-0036. The Government has certain rights in this invention.

FIELD

The present invention relates generally to airborne array antennas, and more specifically, to systems and methods for determining a positional state of an airborne array antenna using distributed accelerometers.

BACKGROUND

A class of very large flexible radar arrays, used to implement electronically scanned array (ESA) radars, is needed for a number of future applications. These ESA arrays are flexible and mounted in airborne platforms with propulsion systems and other sources of input motion. Due to the flexible nature of the arrays, their shape is dynamic and often needs to be measured. Flexible arrays have often been measured by optical systems that directly determine array shape and orientation. Most arrays, whether considered flexible or not, have an inertial navigation service that uses either inertial instruments (usually an integrated navigation system or INS) that is co-located with the array, as with most fighter radars. In cases where co-location of an INS is not possible for packaging reasons, an additional inertial instrument such as a small inertial measurement unit (IMU) may be co-located with the array and used for local motion measurement, as is the case for some large surveillance radars.

For very large flexible arrays, use of a co-located inertial instrument is often impractical because of the size and scale of the array. In addition, a single inertial instrument often cannot be physically attached to the array or its suspension system rigidly enough, nor is the array itself generally rigid enough, to ensure adequate knowledge of the dynamic motion of the array. However, optical systems have not yet been devised that allow for measurement of such a large array at the temporal and spatial resolution that is generally needed to support beam forming for an ESA radar. As such, there is a need for a system and method for determining the position, orientation, and shape of an airborne radar array.

SUMMARY

Aspects of the invention relate to systems and methods for determining a positional state of an airborne array antenna using distributed accelerometers. In one embodiment, the invention relates to a method for determining a positional state of an airborne array antenna using an array of distributed accelerometers, the method including receiving and formatting acceleration data from each of a plurality of accelerometers mounted at different locations along the array antenna, receiving position and orientation data from an inertial navigation service (INS) mounted on the array antenna, generating an INS estimated position for each accelerometer based on the position and orientation data from the INS, generating an accelerometer estimated position for each accelerometer based on the acceleration data, determining a position and orientation of each accelerometer based on the respective INS estimated position and the respective accelerometer estimated position, determining an estimated position of a center and an orientation of the array antenna based on the determined position and orientation of each accelerometer, and adjusting a direction of the array antenna based on the estimated position of the array antenna.

In another embodiment, the invention relates to a system for determining a positional state of an airborne array antenna using an array of distributed accelerometers, the system including an array antenna, a plurality of accelerometers mounted at different locations along the array antenna, an inertial navigation service (INS) mounted on the array antenna, a processing circuitry configured to receive and format acceleration data from each of the plurality of accelerometers, receiving position and orientation data from the inertial navigation service (INS), generate an INS estimated position for each accelerometer based on the position and orientation data from the INS, generate an accelerometer estimated position for each accelerometer based on the acceleration data, determine a position and orientation of each accelerometer based on the respective INS estimated position and the respective accelerometer estimated position, and determine an estimated position of a center and an orientation of the array antenna based on the determined position and orientation of each accelerometer.

DETAILED DESCRIPTION

Figure 1:
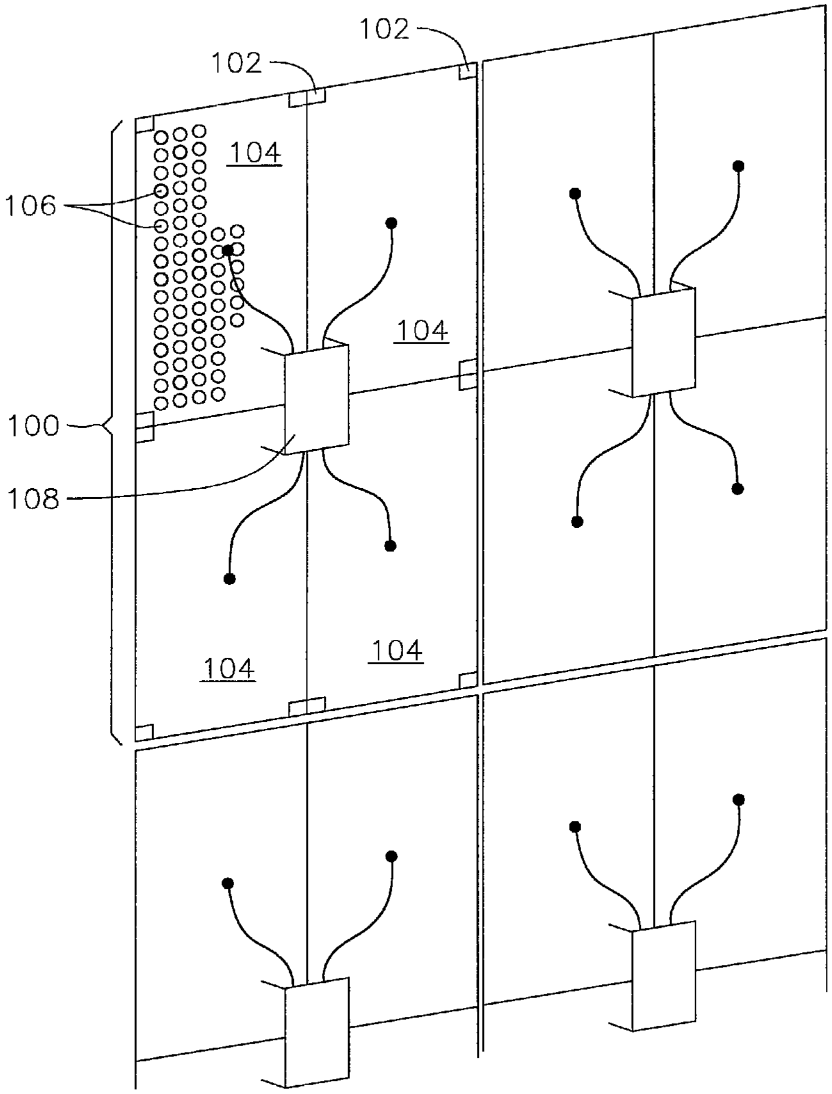
FIG. 1 is a perspective view of a portion of an airborne array antenna including multiple accelerometers uniformly mounted along the array in accordance with one embodiment of the invention.

Referring now to the drawings, systems and methods for determining the position and orientation (e.g., positional state) of an airborne array antenna using distributed accelerometers are illustrated. The positional state determining systems include an array of accelerometers distributed about the array antenna and coupled to processing circuitry. The processing circuitry receives data from each of the accelerometers and an inertial navigation system (INS) and calculates the positional state of the array based on the data from both components. The positional state of the array can be used for beam steering by steering circuitry. In addition, the positional state of the array can be used for a number of other useful applications, including, for example, for actively pointing the beam, and by the RF signal processing for performing Doppler compensation and other motion compensation required for coherent detection.

To calculate the positional state of the array, the processing circuitry can receive and format acceleration data from each of the plurality of accelerometers, receive position and orientation data from the INS, generate an INS estimated position for each accelerometer based on the position and orientation data from the INS, generate an accelerometer estimated position for each accelerometer based on the acceleration data, determine a position and orientation of each accelerometer based on the respective INS estimated position and the respective accelerometer estimated position, and then determine an estimated position of a center and an orientation of the array antenna based on the determined position and orientation of each accelerometer.

FIG. 1 is a perspective view of a sub-array 100 of an airborne array antenna including multiple accelerometers 102 uniformly mounted along the array 100 in accordance with one embodiment of the invention. The sub-array 100 includes four co-planar panels (or "portions") 104 arranged in a flat-panel configuration. Each panel 104 includes a number of radiating elements 106 positioned thereon. The sub-array 100 further includes a beam steering circuit 108 mounted at the intersection point of the four panels 104. The beam steering circuit 108 is electrically coupled to each panel 104 and to various radiating elements 106 positioned thereon. The beam steering circuit 108 can be controlled by master steering circuitry (e.g., a beam steering computer), which is not shown.

The accelerometers 102 are coupled to processing circuitry (not shown) positioned along or in the vicinity of the array. The accelerometers 102 are each configured to measure acceleration and provide those measurements to the processing circuitry. In some embodiments, the processing circuitry is a component of the master steering circuitry. In one embodiment, the processing circuitry is implemented using the beam steering circuits 108 which receive and forward acceleration data to the master steering circuitry for processing. In the embodiment illustrated in FIG. 1, the accelerometers 102 are uniformly distributed in being positioned at the corners of each panel 104. In other embodiments, the accelerometers may be positioned in other uniform and non-uniform configurations. In several embodiments, the accelerometer positioning may be determined by the intended application and the degree of accuracy needed therefrom. In one embodiment, for example, the accelerometer type and positioning along the array may be determined based on a degree of error between the INS native to the array antenna and true position.

In several embodiments, the accelerometers are distributed about the array at a spatial density that is capable of capturing motion at spatial frequencies that are considered significant. In one embodiment, the accelerometers are tri-axial micro-electro-mechanical systems (MEMS) accelerometers. In such case, these MEMS accelerometers are generally not navigation-grade instruments, and accrue position error rapidly on an individual basis. As such, the system accuracy improves with the density and number of accelerometer sites, which can be scaled due to their relative low cost.

Figure 2:
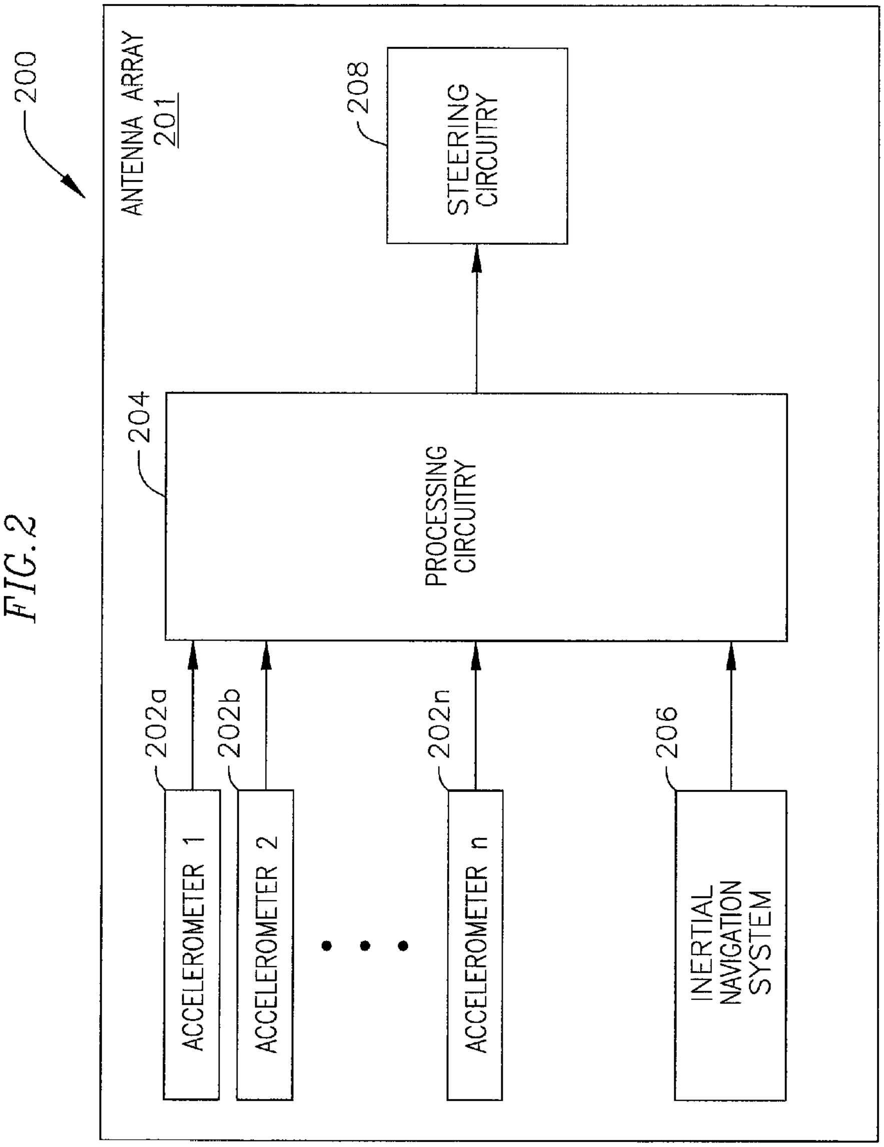
FIG. 2 is a schematic block diagram of a system for determining a positional state of an airborne array antenna, where the system includes processing circuitry coupled to a number of distributed accelerometers, an inertial navigation system (INS) and steering circuitry in accordance with one embodiment of the invention.

FIG. 2 is a schematic block diagram of a system 200 for determining a positional state of an airborne array antenna 201, where the system includes processing circuitry 204 coupled to a number of distributed accelerometers (202*a*-202*n*), an inertial navigation system (INS) 206 and steering circuitry 208 in accordance with one embodiment of the invention. The processing circuitry 204 receives and formats acceleration data from each of the accelerometers (202*a*-202*n*) and generates an accelerometer estimated position for each accelerometer based on the acceleration data. The processing circuitry 204 also receives position and orientation data from the INS 206 and generates an INS estimated position for each accelerometer based on this data.

The processing circuitry 204 can then compare the estimated accelerometer positions based on the accelerometer data and the INS estimated position, while correcting for various factors including gravity and known error in the INS and accelerometers, to determine a position and orientation of each accelerometer. The processing circuitry 204 uses the calculated position and orientation of each accelerometer to determine an estimated position of a center and an orientation of the array antenna. The steering circuitry 208 makes appropriate adjustments to the beam direction of the array antenna based on the estimated position of the center and the orientation of the array antenna. The distributed accelerometers include components 202*a* to 202*n* where n is a positive integer. In some embodiments, the positional state determination system can include hundreds or thousands of accelerometers.

In some embodiments, the processing circuitry includes one or more processing components that are co-located. In other embodiments, the processing circuitry includes one or more processing components that are distributed at various locations around the array antenna. In some embodiments, the processing circuitry can be implemented using any combination of processors, memory, discrete logic components, data buses and/or other processing elements that share information.

Figure 3:
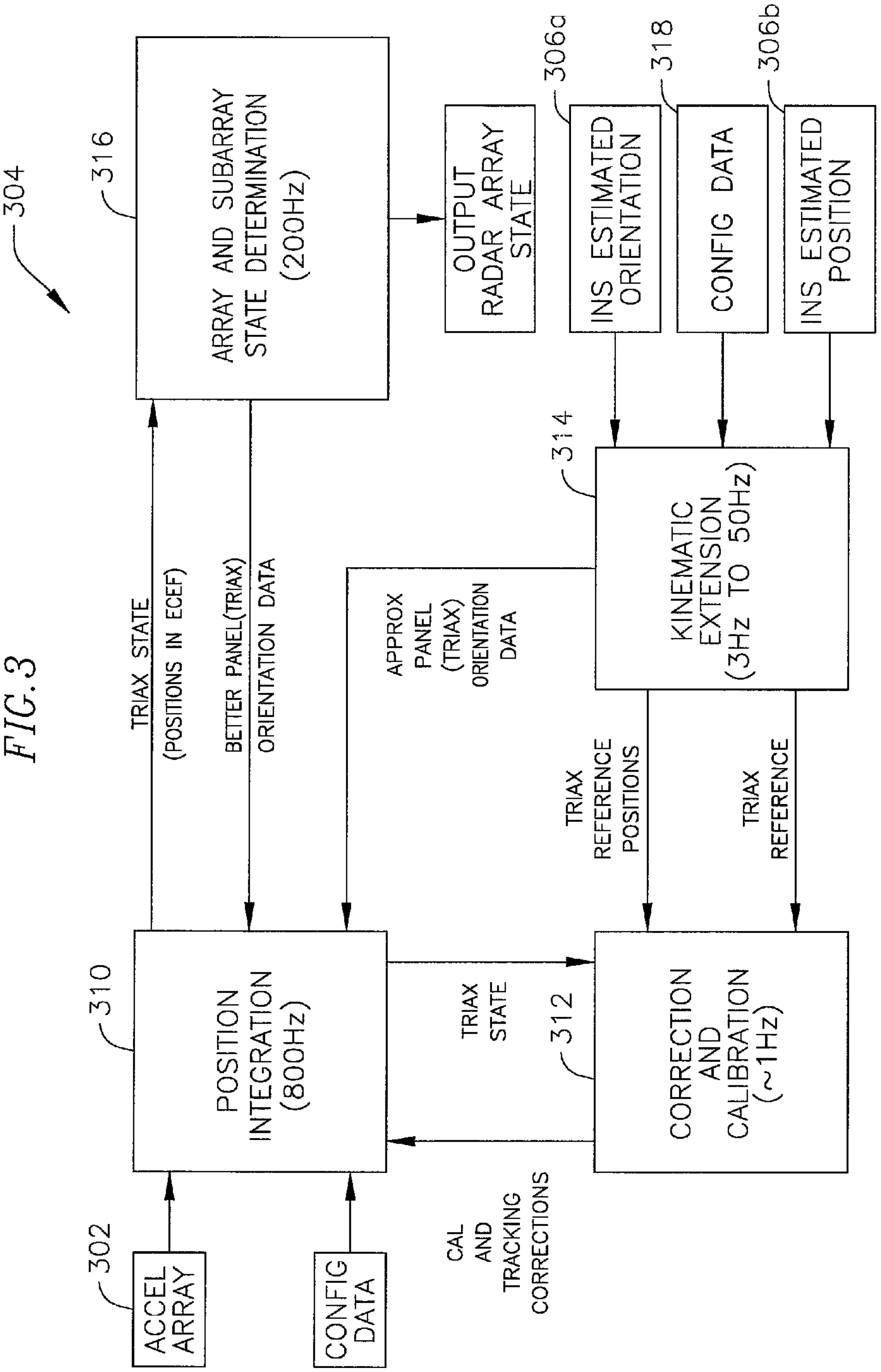
FIG. 3 is a functional block diagram of the processing circuitry of the position determining system of FIG. 2, where the processing circuitry includes processing blocks for position integration, correction and calibration, kinematic extension and array state determination in accordance with one embodiment of the invention.

FIG. 3 is a functional block diagram of the processing circuitry 304 of the position determining system of FIG. 2, where the processing circuitry 304 includes processing blocks for position integration 310, correction and calibration 312, kinematic extension 314 and array state determination 316 in accordance with one embodiment of the invention. In operation, the kinematic extension block 314 receives INS estimated panel orientation data 306*a* and INS estimated panel position data 306*b* from the INS (not shown in FIG. 3 but see FIG. 2). The kinematic extension block 314 also receives configuration data 318 including data indicative of the relative physical positioning of each accelerometer in relation to the INS on the array antenna. In one embodiment, the configuration data 318 is contained in a table. Based on the INS estimated panel orientation data 306*a*, the INS estimated position data 306*b*, and configuration data 318, the kinematic extension block 314 extrapolates the INS estimated panel orientation and position data to each accelerometer, thereby determining an INS estimated orientation and position of each accelerometer. Essentially, the kinematic extension block 314 performs a lever-arm correction between the INS and each accelerometer site and performs any data time-alignment (interpolation or extrapolation) that is needed since the INS and accelerometers generally will not sample on the same sampling timeline. The kinematic extension block 314 provides the INS estimated orientation and position of each accelerometer to the correction and calibration block 312.

The position integration block 310 receives acceleration data 302 from the array of accelerometers, corrected and calibrated position data from the correction and calibration block 312, and approximate panel orientation data from the kinematic extension block 314. Using the acceleration data 302 and an integration process (discussed in further detail below), the position integration block 310 generates an accelerometer estimated position for each accelerometer and provides it to the array state determination block 316. The position integration block 310 corrects the accelerometer data for any biases, corrects for gravity and does the kinematic corrections needed to make the acceleration vector an Earth-relative quantity. It then integrates the resulting acceleration data/vector into velocity and into position using one of a number of integration techniques (e.g., forward Euler, trapezoidal).

The correction and calibration block 312 receives, formats and filters the INS estimated orientation and position from the kinematic extension block 314, and the accelerometer estimated position and orientation data from the position integration block 310. The correction and calibration block 312 compares the two sources of position information, computes a residual, and uses a Kalman filter to thereby determine a position and orientation of each accelerometer based on the respective INS estimated position and orientation data and the respective accelerometer estimated position and orientation data. This information is provided to the position integration block 310, and passed along to the array state determination block 316.

The array state determination block 316 determines an estimated position of a center and an orientation of the array antenna based on the determined position and orientation of each accelerometer from the position integration block 310 and correction and calibration block 312. In several embodiments, the estimated position of the center and the orientation of the array antenna is a parametric fit of three degree of freedom (3-DOF) accelerometer position and orientation data and 3-DOF INS position and orientation data to form a 6-DOF estimated position of the center and the orientation of the array antenna. In several embodiments, the scope of the fit can be related to the whole aperture, sub-arrays, panels, or the shape of panels of the array antenna.

The array state determination block 316 can direct beam steering circuitry, such as steering circuitry 208, to continuously adjust the beam of the array in accordance with the estimated position of the center and the orientation of the array antenna. The array state determination block 316 can also provide the estimated position of the center and the orientation of the array antenna to other components for a number of other applications. In such case, the estimated position of the center and the orientation of the array antenna may be formatted in any number of ways suitable for the particular application.

A exemplary implementation including multiple functional blocks is illustrated in FIG. 3. However, in other embodiments, other processing circuitry in other suitable configurations can be used to receive and process data from the INS and the array accelerometers and to then compute the position and orientation of the array antenna.

Figure 4:
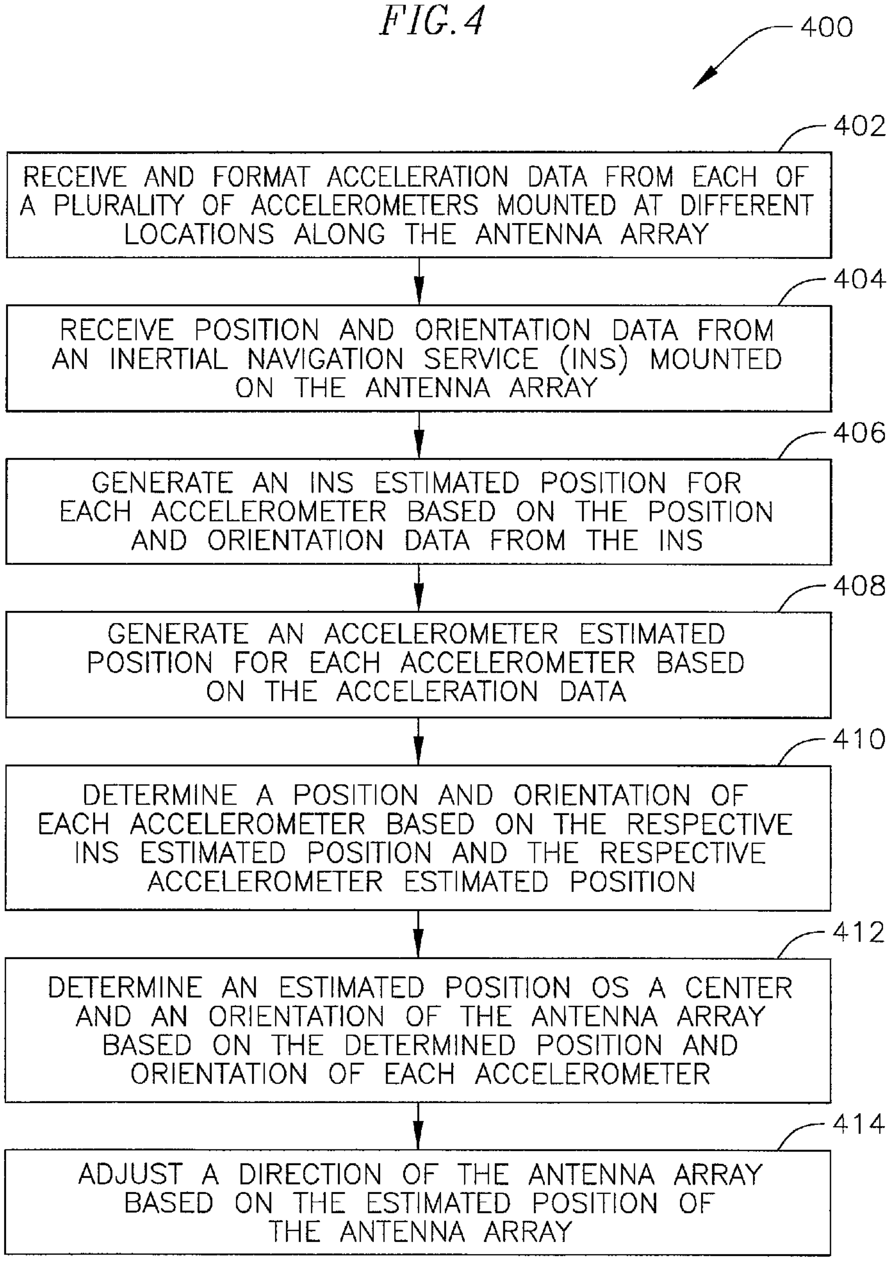
FIG. 4 is a flow chart of a process for determining a positional state of an airborne array antenna having multiple accelerometers in accordance with one embodiment of the invention.

FIG. 4 is a flow chart of a process 400 for determining a positional state of an airborne array antenna having multiple accelerometers in accordance with one embodiment of the invention. In particular embodiments, the process 400 can be used with the processing circuitry of FIG. 2 or FIG. 3. The process first receives and formats (402) acceleration data from each of a plurality of accelerometers mounted at different locations along the array antenna. The process receives (404) position and orientation data from an inertial navigation service (INS) mounted on the array antenna. The process then generates (406) an INS estimated position for each accelerometer based on the position and orientation data from the INS. The process generates (408) an accelerometer estimated position for each accelerometer based on the acceleration data. The process then determines (410) a position and orientation of each accelerometer based on the respective INS estimated position and the respective accelerometer estimated position. The process determines (412) an estimated position of a center and an orientation of the array antenna based on the determined position and orientation of each accelerometer. The process then can adjust (414) a direction of the array antenna based on the estimated position of the array antenna (e.g., radar array state).

In one embodiment, the process can perform the sequence of actions in a different order. In another embodiment, the process can skip one or more of the actions. In other embodiments, one or more of the actions are performed simultaneously. In some embodiments, additional actions can be performed.

Figure 5:
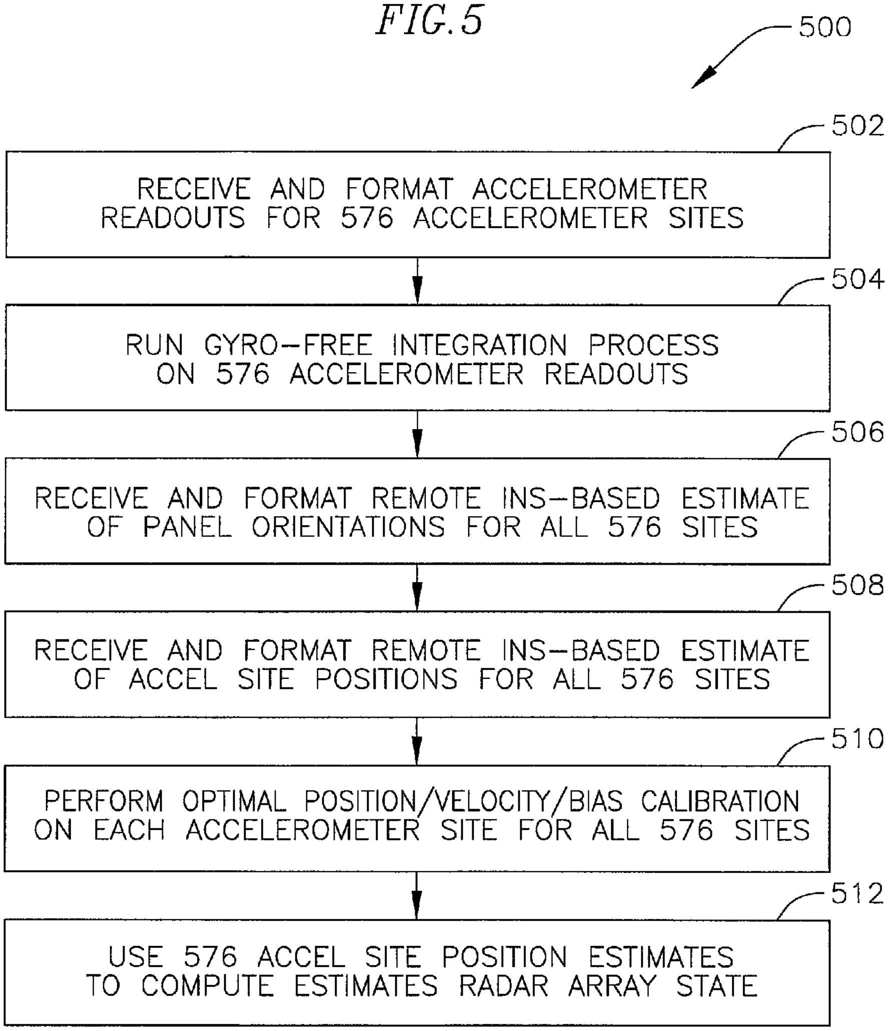
FIG. 5 is a flow chart of another process for determining a positional state of an airborne array antenna having multiple accelerometers in accordance with one embodiment of the invention.

FIG. 5 is a flow chart of another process 500 for determining a positional state of an airborne array antenna having multiple accelerometers in accordance with one embodiment of the invention. In particular embodiments, the process 500 can be used with the processing circuitry of FIG. 2 or FIG. 3. The process first receives and formats (502) accelerometer readouts (e.g., data) for 576 accelerometer sites. In several embodiments, each readout is a three by one vector. In one embodiment, block 502 is performed at a frequency of about 800 Hz. In several embodiments, the process may receive and format data for more than or less than 576 accelerometer sites. The process then runs (504) a gyroscope-free integration process on the 576 accelerometer readouts. In one embodiment, block 504 is performed at a frequency of about 800 Hz. In some embodiments, the execution of the gyroscope-free integration process is performed by the position integration block 310 of FIG. 3. In some conventional systems for determining the position of an airborne body, a gyroscope is used. However, in a number of embodiments described herein, the systems and methods can operate without use of a gyroscope.

The process then receives and formats (506) remote INS-based estimates of panel orientations for all 576 sites. In one embodiment, block 506 is performed at a frequency of about 50 Hz. In some embodiments, the execution of the block 506 is performed by the kinematic extension block 314 of FIG. 3. The process then receives and formats (508) remote INS-based estimates of accelerometer site positions for all 576 accelerometer sites. In one embodiment, block 508 is performed at a frequency of about 1 Hz. In some embodiments, the execution of the block 508 is performed by the correction and calibration block 312 of FIG. 3. The process then performs (510) optimal position/velocity/bias calibration on each accelerometer site for each of the 576 accelerometer sites. Optimal in this context refers to the application of linear filtering and estimation theory which underpins the Kalman Filter that is proposed for calibration of the accelerometers and their outputs, but there are other estimation strategies which may also be applicable. In one embodiment, block 510 is performed at a frequency of about 1 Hz. In some embodiments, the execution of the block 510 is performed by the correction and calibration block 312 and/or position integration block 310 of FIG. 3.

The process then uses (512) the 576 accelerometer site position estimates to compute an estimated radar array state. In one embodiment, block 512 is performed at a frequency of about 50 to 200 Hz. In some embodiments, the execution of the block 512 is performed by the position integration block 310 and/or array state determination block 316 of FIG. 3. In some embodiments, the estimated radar array state is determined using a simple planar fit to the locations, or an all-out shape fit of the array antenna (e.g., possibly a deformed array). In several embodiments, as the precision of the accelerometers used is increased (primarily via reductions in process noise as MEMS technology progresses), so is the complexity of radar array shapes that can be accurately represented.

The estimated radar array state will inherently share a common inertial reference with the INS, and it is bandwidth extended from the low-bandwidth typically afforded from the remote INS to the high bandwidth of the MEMS accelerometers. As such, several embodiments of the systems and processes described herein can use a distributed array of independently navigated, gyro-free tri-axial accelerometer sites to form a large radar array state estimate, potentially including flexible-body type shapes, which has a common inertial reference with a master navigator (e.g., INS).

In one embodiment, the process can perform the sequence of actions in a different order. In another embodiment, the process can skip one or more of the actions. In other embodiments, one or more of the actions are performed simultaneously. In some embodiments, additional actions can be performed.

Figure 6:
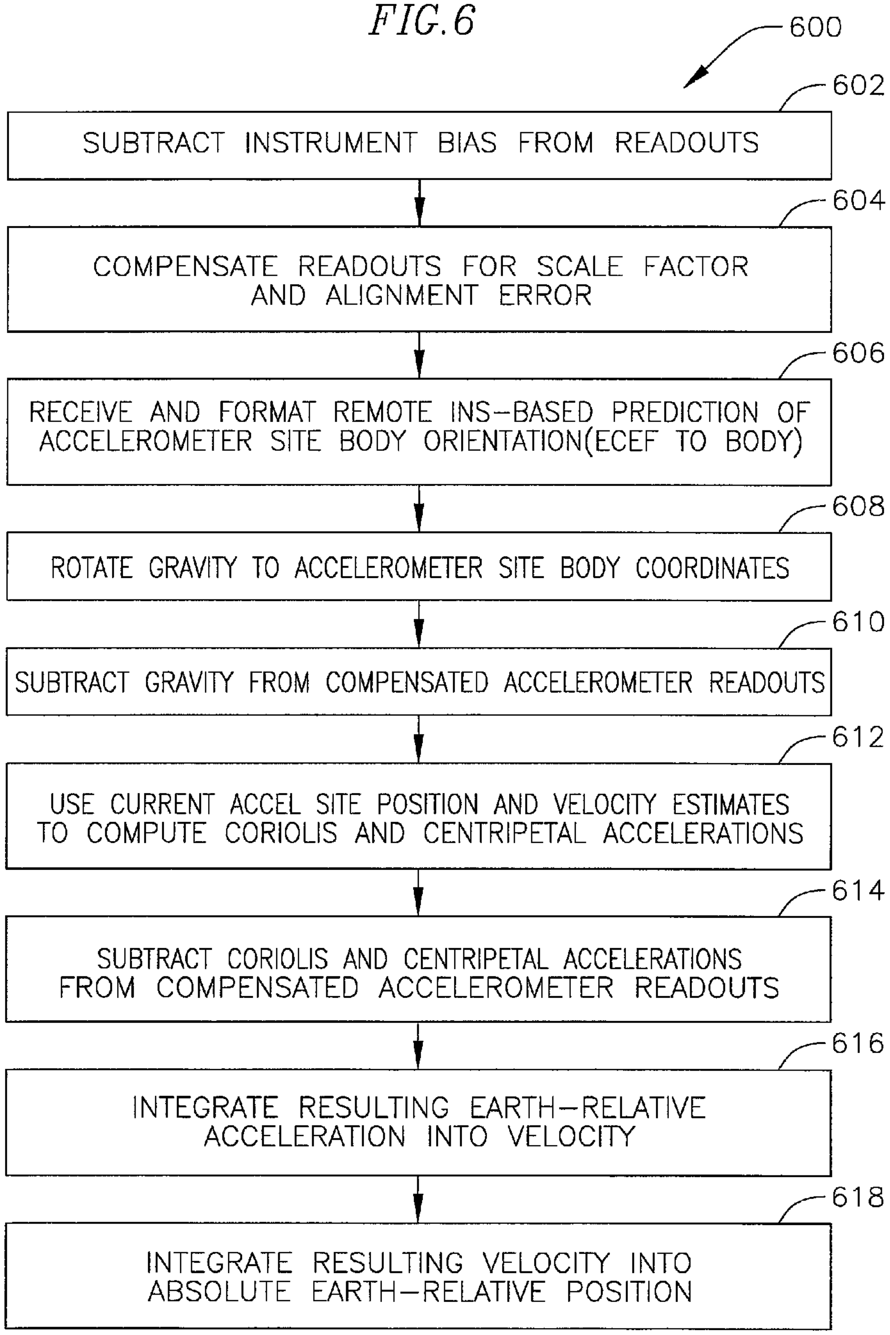
FIG. 6 is a flow chart of an integration process for processing data received from each of the multiple accelerometers of the process of FIG. 5 in accordance with one embodiment of the invention.

FIG. 6 is a flow chart of an integration process 600 for processing data received from each of the multiple accelerometers of the process of FIG. 5 in accordance with one embodiment of the invention. In particular embodiments, process 600 executes as a sub-process to block 504 in FIG. 5. The process first subtracts (602) instrument bias from the accelerometer readouts received from each of the accelerometers. The process compensates (604) accelerometer readouts for scale factor and alignment error. In this context, scale factor relates to the knowledge of how the digital numbers indicated by the accelerometers are converted to actual sensed acceleration, and more specifically, to the ratio between the true scale factor and an assumed device scale factor for the accelerometers, where the assumed device scale factor is generally provided by a datasheet for the accelerometers. The process then receives and formats (606) remote INS-based predictions of site body orientations (e.g., earth centered/earth fixed or ECEF to body) for each accelerometer.

The process rotates (608) gravity to accelerometer site body coordinates. This rotation can encompass using the gravity data known from the INS and extrapolating the data along each of the tri-axial axes. In such case, the extrapolated gravity data can be subtracted from accelerometer measurement data. As such, the process then subtracts (610) the gravity from compensated accelerometer readouts (e.g., to correct for gravity). The process uses (612) current accelerometer site position and velocity estimates to compute coriolis and centripetal accelerations. The process then subtracts (614) the coriolis and centripetal accelerations from compensated accelerometer readouts. The process integrates (616) resulting Earth-relative acceleration from block 614 into velocity. The process then integrates (618) the resulting velocity into an absolute Earth-relative position determination. In some embodiments, the execution of sub-process 600 is performed by the position integration block 310 of FIG. 3.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 7:
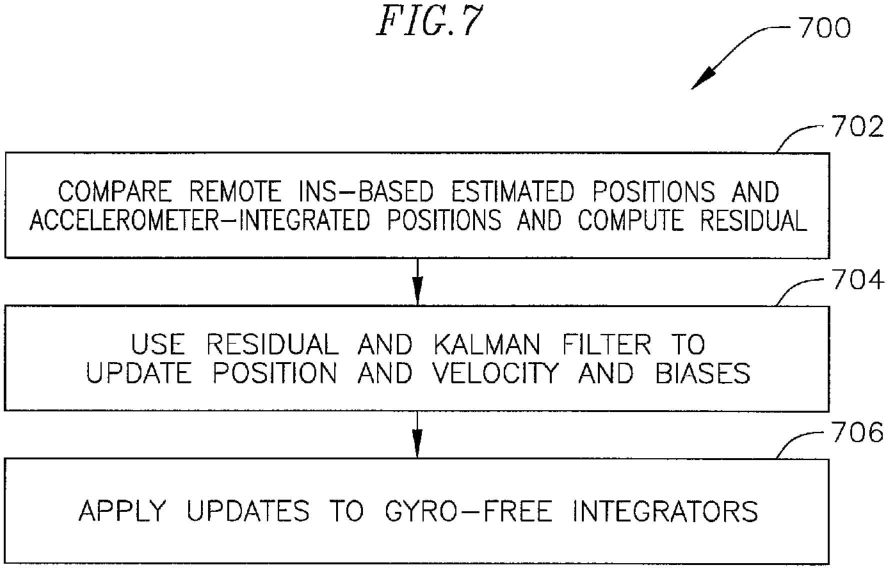
FIG. 7 is a flow chart of a calibration process for calibrating data received from each of the multiple accelerometers of the process of FIG. 5 in accordance with one embodiment of the invention.

FIG. 7 is a flow chart of a calibration process 700 for calibrating data received from each of the multiple accelerometers of the process of FIG. 5 in accordance with one embodiment of the invention. In particular embodiments, process 700 executes as a sub-process to blocks 508 and/or 510 in the process of FIG. 5. The process first compares (702) remote INS-based estimated positions and accelerometer integrated positions to compute a residual value. The process then uses (704) the residual value and one or more Kalman filter(s) to update position, velocity and biases. The process then applies (706) updates to the gyro-free integrators. In several embodiments, these updates are computed by the correction and calibration block 312 from FIG. 3. This update or correction removes observed biases from the accelerometer (site) integrated positions and other biases, such as accelerometer output bias, using the optimal Kalman filter that is part of the correction and calibration block. In some embodiments, the execution of sub-process 700 is performed by the correction and calibration block 312 of FIG. 3.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for determining a positional state of an airborne array antenna using an array of distributed accelerometers, the airborne antenna array comprising a plurality of portions, the method comprising:

receiving and formatting, by a controller, acceleration data from each of a plurality of accelerometers mounted on different portions along the array antenna;

receiving, by the controller, position and orientation data from an inertial navigation service (INS) mounted on the array antenna;

generating, by the controller, an INS estimated position for each accelerometer based on the position and orientation data from the INS;

generating, by the controller, an accelerometer estimated position for each accelerometer based on the acceleration data;

determining, by the controller, a position and orientation of each portion of the array antenna based on the respective INS estimated position and the respective accelerometer estimated position by comparing the respective INS estimated position and the respective accelerometer estimated position to determine a respective updated accelerometer estimated position for each of the plurality of portions;

determining, by the controller, an estimated position of a center and an orientation of the array antenna based on the determined position and orientation of each portion; and adjusting, by the controller, a direction of the array antenna based on the estimated position of the array antenna.

2. The method of claim 1, wherein the plurality of accelerometers are uniformly positioned along the array antenna.

3. The method of claim 1, wherein the plurality of accelerometers are tri-axial micro-electro-mechanical systems (MEMS) accelerometers.

4. The method of claim 1, wherein the determining the position and orientation of each portion based on the respective INS estimated position and the respective accelerometer estimated position further comprises:

generating a residual based on the comparison of the INS estimated position and the accelerometer estimated position;

determining the updated accelerometer estimated position based on the residual; and using the updated accelerometer estimated position in determining the position and orientation of each accelerometer based on the respective INS estimated position and the respective accelerometer estimated position.

5. The method of claim 1, wherein the generating the accelerometer estimated position for each accelerometer based on the acceleration data comprises compensating for instrument bias.

6. The method of claim 1, wherein the generating the accelerometer estimated position for each accelerometer based on the acceleration data comprises compensating for gravity.

7. The method of claim 1, wherein the generating the accelerometer estimated position for each accelerometer based on the acceleration data comprises:

generating coriolis and centripetal accelerations based on accelerometer data; and compensating for the coriolis and centripetal accelerations.

8. A system for determining a positional state of an airborne array antenna using an array of distributed accelerometers, the system comprising:

an array antenna comprising a plurality of portions;

a plurality of accelerometers mounted on different portions along the array antenna;

an inertial navigation service (INS) mounted on the array antenna; and a processing circuitry configured to:

receive and format acceleration data from each of the plurality of accelerometers;

receiving position and orientation data from the inertial navigation service (INS);

generate an INS estimated position for each accelerometer based on the position and orientation data from the INS;

generate an accelerometer estimated position for each accelerometer based on the acceleration data;

determine a position and orientation of each portion of the array antenna based on the respective INS estimated position and the respective accelerometer estimated position by comparing the respective INS estimated position and the respective accelerometer estimated position to determine an respective updated accelerometer estimated position for each of the plurality of portions; and determine an estimated position of a center and an orientation of the array antenna based on the determined position and orientation of each portion.

9. The system of claim 8, further comprising a steering controller configured to adjust a direction of the array antenna based on the estimated position of the array antenna.

10. The system of claim 8, wherein the plurality of accelerometers are uniformly positioned along the array antenna.

11. The system of claim 8, wherein the plurality of accelerometers are tri-axial micro-electro-mechanical systems (MEMS) accelerometers.

12. The system of claim 8, wherein the processing circuitry is further configured to:

generate a residual based on the comparison of the INS estimated position and the accelerometer estimated position;

determine the updated accelerometer estimated position based on the residual; and use the updated accelerometer estimated position to determine the position and orientation of each accelerometer based on the respective INS estimated position and the respective accelerometer estimated position.

13. The system of claim 8, wherein the processing circuitry is further configured to compensate for instrument bias.

14. The system of claim 8, wherein the processing circuitry is further configured to compensate for gravity.

15. The system of claim 8, wherein the processing circuitry is further configured to:

generate coriolis and centripetal accelerations based on accelerometer data; and compensate for the coriolis and centripetal accelerations.

16. The method of claim 1, wherein the airborne antenna array is flexible.

17. The system of claim 8, wherein the array antenna is flexible.

* * * * *